June 27, 1967 H. ZENKE 3,327,997
SENSING APPARATUS
Filed Feb. 16, 1965 4 Sheets-Sheet 2

June 27, 1967 H. ZENKE 3,327,997
SENSING APPARATUS
Filed Feb. 16, 1965 4 Sheets-Sheet 3
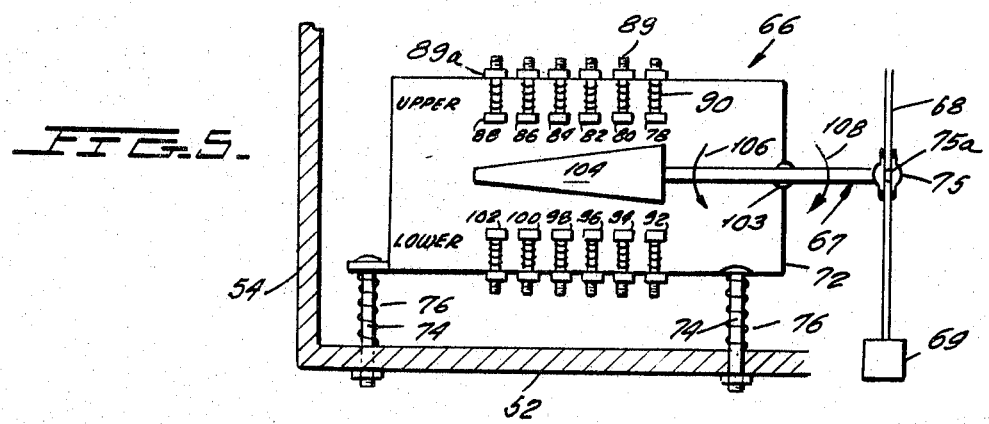
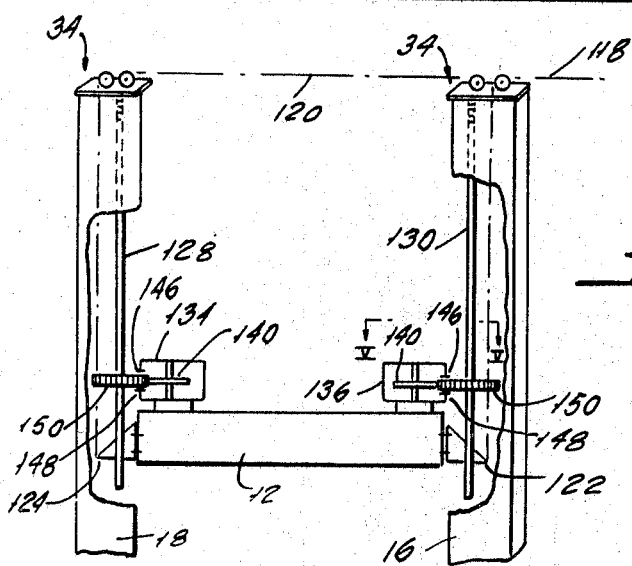
INVENTOR.
HOWARD ZENKE
BY
OSTROLENK, FABER, GERB & SOFFEN
ATTORNEYS

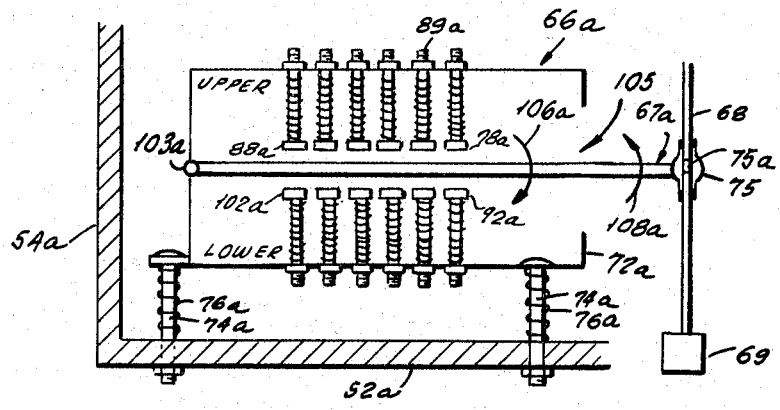
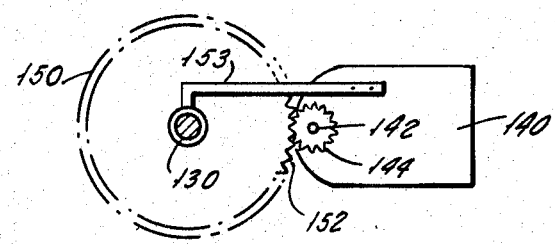

United States Patent Office 3,327,997
Patented June 27, 1967

3,327,997
SENSING APPARATUS
Howard Zenke, Brooklyn, N.Y., assignor to Zetco Engineering and Tool Company, Inc., Brooklyn, N.Y., a corporation of New York
Filed Feb. 16, 1965, Ser. No. 433,009
13 Claims. (Cl. 254—89)

This invention relates to building construction, and more particularly to an apparatus for sensing the variation in relative position between a plurality of points about a body being lifted.

In the construction of multi-story buildings it is extremely desirable and efficient to lift pre-formed floors from the ground level to the various positions which they will occupy in the finished structure. Such a method of construction eliminates the necessity of lifting the multitude of materials and tools which would be necessary to construct the floor at a higher level and also reduces the time which workmen have to spend at those higher levels.

In carrying out the above preferred type of construction, certain problems have been encountered. Specifically, in attempting to lift a pre-formed floor, such as concrete, if all the points of the floor are not lifted at the same rate of speed, tremendous bending stresses are applied to the slab with resultant weakening and ultimate cracking of the floor.

Prior art attempts to overcome this difficulty have resulted in costly and complex sensing apparatus which suffers from many disadvantages. Illustrations of such prior art apparatus for sensing the relative elevations of a plurality of points may be found in patents 2,617,168, issued to N. A. Johnson; 2,715,013, issued to T. B. Slick; and 2,975, 560, issued to L. H. Leonard.

The Johnson patent shows a sensing apparatus which comprises a plurality of interconnected water pipes; a difference in elevation of any of the points of the floor being indicated by appropriate water level gauges located at the ends of each pipe above the various points being sensed. This apparatus is cumbersome with respect to installation and dismantling and furthermore suffers from the inherent disadvantages of handling fluids, i.e., possibility of leaks, rust, freezing etc.

The Slick patent shows apparatus for sensing the relative elevation of a plurality of points which comprises a tensiometer located in each of the plurality of lifting cables. However, the Slick system presupposes that the weight of the floor (and the weight of articles placed thereon) will be evenly distributed throughout the surface, since the readings on each of the tensiometers will be proportional to the weight at each point being sensed. In practice, even distribution rarely occurs, and consequently some type of calibration system may be necessary to initially preset each tensiometer.

The sensing system of the Leonard patent consists of a plurality of criss-crossed sensing cables, each being secured at one end to a surface below the floor being lifted and at the other end to a spring scale. Each sensing cable is guided by two pulleys which are spaced apart and fixed to the floor being lifted. Uneven lifting of the two pulleys causes the sensing cable associated therewith to be subjected to tension which is read on the spring scale associated with that cable. With continual stretching of the sensing cables, however, the accuracy of the system may quickly exceed allowable tolerances.

It is therefore an object of the present invention to overcome the above noted prior art disadvantages by providing a simple and inexpensive apparatus for sensing a deviation in elevation of a plurality of points about a body being lifted.

A further object of the instant invention is to provide such a sensing apparatus in which no part thereof will be subjected to the tension due to the weight of the body being lifted.

Other objects will be apparent to one skilled in the art upon reading the following specification.

The instant invention accomplishes the above mentioned objects by providing a sensing device at each of a plurality of points about the body being lifted, each sensing device moving a first distance corresponding to the movement of its respective point. Actuating means operatively associated with each of the sensing devices move a second distance corresponding to the movement of a common preselected region of the body. Finally, each of the sensing devices includes apparatus for indicating a deviation of the above mentioned first and second distances and thus indicates the relative movement of each sensing device with respect to the preselected, common region. By monitoring all of the sensing devices one is able to determine the relative position of any of the points under consideration with respect to the common region, and with respect to one another.

As will be hereinafter shown, by having the sensing devices compared to a common point on the body being lifted, the resulting system functions independently of the lifting system; independently of the weight of the body being lifted; and furthermore indicates deviation of elevation by means other than direct tension methods prevalent in the prior art.

A fuller understanding of the invention may be had by referring to the following description taken in conjunction with the accompanying drawings in which:

FIG. 5 is a schematic side view of a sensing device shown in FIG. 1.

FIG. 6 is a schematic illustration of a control panel which might be used in conjunction with the sensing device shown in FIG. 5.

FIG. 7 is a schematic illustration of a second embodiment of the instant invention.

FIG. 8 is a plan view taken along the arrows V—V of FIG. 7.

FIG. 9 is a schematic side view of an alternative embodiment of the sensing device of FIG. 5.

Figure 1:
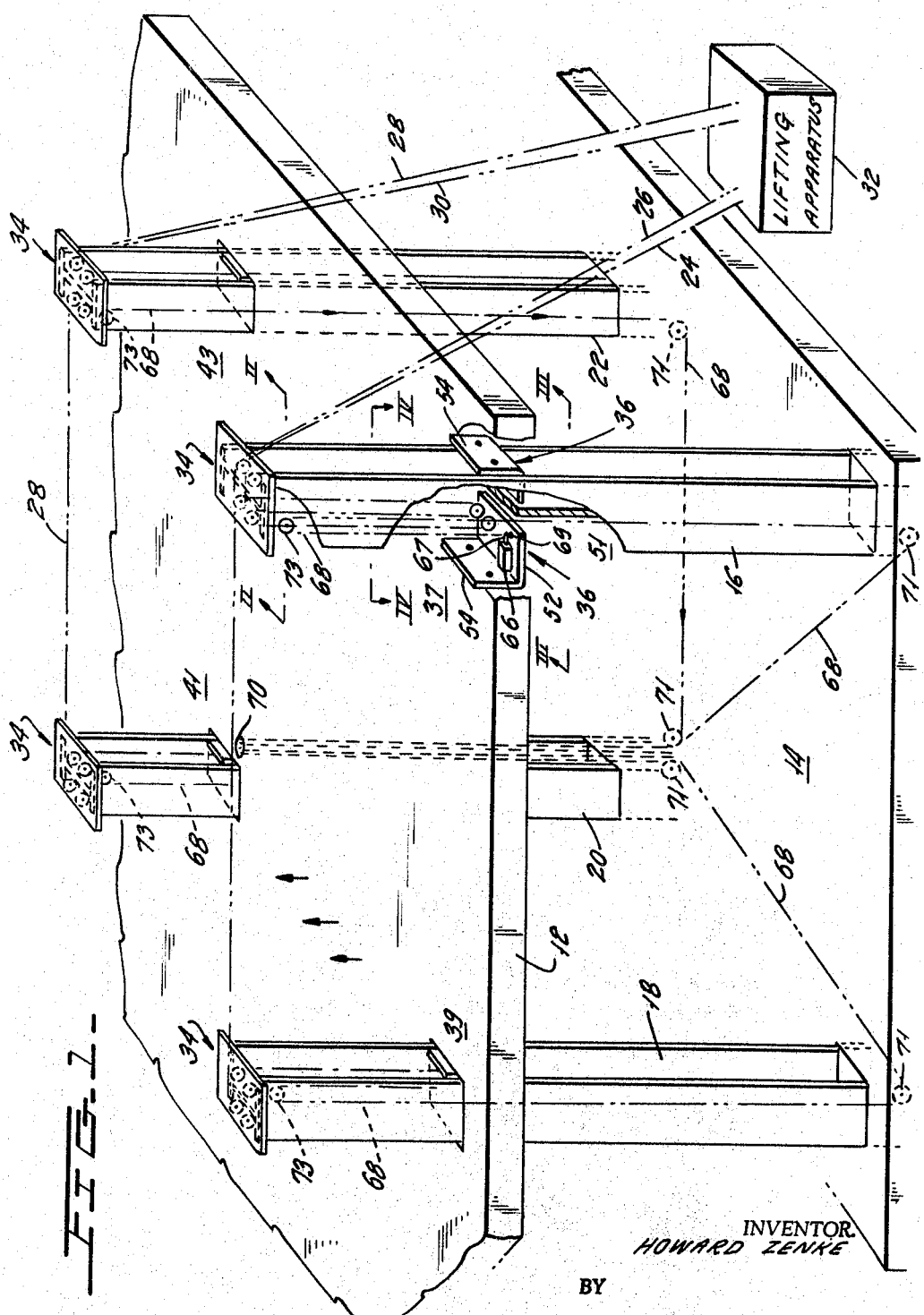
FIG. 1 is a perspective view of the preferred embodiment of the instant invention.

Referring to FIG. 1, there is shown a pre-formed floor 12 which is in the process of being lifted from a surface 14 (which may be ground level or another floor of a multi-story structure which has previously been secured in place) along the I-beam uprights 16, 18, 20, 22.

The floor 12 is lifted by a plurality of lifting cables 24, 26, 28, 30 which are each secured at one end to the floor (as will be hereinafter described) and at the other end to lifting apparatus 32. Lifting apparatus 32 may be of any suitable type, such as a large single take-up drum; a plurality of smaller take-up drums, each associated with a single cable; or a truck or caterpillar which moves away from the construction site and thus effects lifting of the floor 12. The lifting cables 24, 26, 28, 30 each pass over the tops of their respective I-beams 16, 18, 20, 22, guided by pulleys systems indicated generally at 34, and down within interior channels 51 and 51a of each I-beam to support structures 36 which are temporarily secured to the side of the floor 12 at four points generally indicated at 37, 39, 41, 43. Although only four general points are illustrated in FIGURE 1, any number of points and uprights may be used depending on the shape and weight of the floor being lifted.

Figure 2:
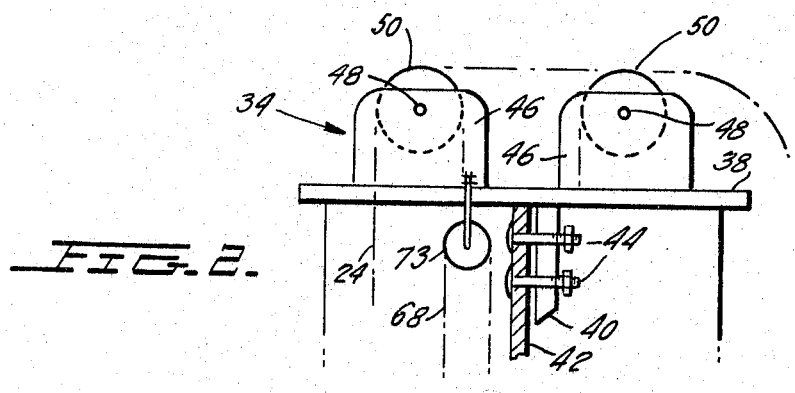
FIG. 2 is a cross-sectional view taken along the arrows II—II of FIG. 1.

As can be seen in FIGURE 2, each pulley system 34 for raising floor 12 comprises a planar surface 38 having a depending fin 40 secured to the web 42 of its respective I-beam by bolts 44. Side walls 46 are fixed to planar surface 38 and house axles 48 which carry four freely rotatable pulleys 50. Pulleys 50 guide and support the aforementioned lifting cables.

Figure 3:
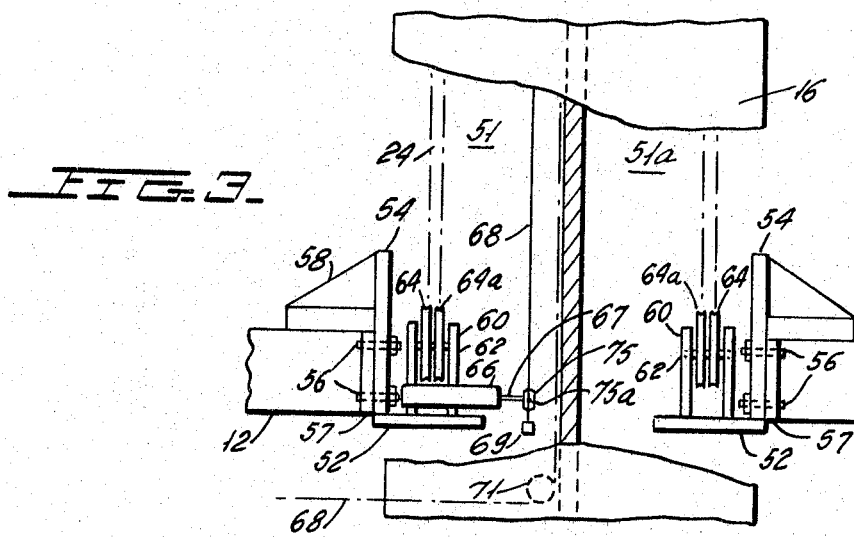
FIG. 3 is a side elevation view taken along the arrows III—III of a portion of FIG. 1.
Figure 4:
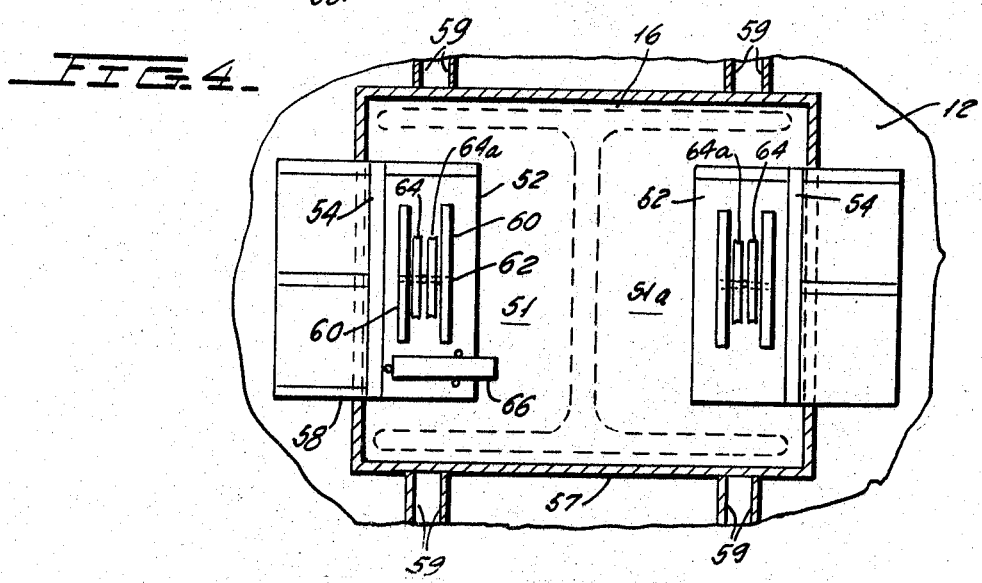
FIG. 4 is a plan view taken along the arrows IV—IV of FIG. 1.

As can be seen in FIGURES 3 and 4, one support structure 36 resides within each of the interior channels 51 and 51a of its respective I-beam and comprises a base portion 52 and upwardly extending portion 54 which is secured to the floor 12 by bolts 56. Bolts 56 are embedded in a steel collar 57 which is used to permanently secure floor 12 to the I-beams when the floor is in its final position as by welding, bolting, etc. Steel reinforcement rods 59 used in floor construction can be affixed to steel collar 57 by welding, etc. (see FIGURE 4). Upwardly extending portion 54 is provided with an additional fillet 58 to add rigidity to the support structure 36. Each base portion 52 has side walls 60 which house the ends of axle 62 which in turn carry pulleys 64 and 64a. Pulleys 64 and 64a together with pulleys 50 of the corresponding pulley system 34 provide a block and tackle arrangement with proper mechanical advantage for each of the lifting cables 24, 26, 28, 30.

It is to be noted that the aforementioned lifting apparatus is merely illustrative of one of the many available systems which might be utilized in conjunction with the sensing apparatus of the instant invention which is to be presently described.

As was previously mentioned, a previous difficulty in lifting pre-formed floors is to assure that all points on the body are being raised at the same rate of speed, i.e., that there is no deviation in elevation in any of the points along the floor.

As can be seen in FIGURE 1, the instant invention overcomes this difficulty by continually comparing the elevation of each of the plurality of points 37, 39, 41, 43 with a common preselected region 70 preferably located at one of the points of lift such as 37, 39, 41, 43. In the instant case the point 41 has been chosen. If any of the points are being lifted at a different rate of speed than the common region 70, then the lifting speed of that point will be varied accordingly, by suitable adjustment of lifting apparatus 32.

To accomplish this comparison, a plurality of sensing devices 66 are provided (only one of which is shown on FIGURE 1), one being located at each of the points 37, 39, 41, 43 to be sensed. Each sensing device has an associated cable 68 connected at one end to an extending operating or sensing arm 67 of the sensing device and at the other end to the common point 70.

As shown in FIGURES 1 and 3, each cable 68 passes from the common region 70, around pulleys 71 located beneath the surface 14, up the interior channel 51 of the I-beam, and over pulley 73 which is suspended from planar surface 38 of pulley system 34 (FIG. 2). The ends of cable 68 are each provided with a weight 69 and are secured to operating arm 67 by suitable clamping means 75 having a pin 75a extending therethrough.

It is noted that once the cable systems including cables 68, pulleys 71, and pulleys 73, have been installed in the framework of the building being constructed, they can be used for every other floor to be lifted by merely disconnecting the ends of cables 68 from a floor (and its sensing devices) which is in its final position and then reconnecting the ends of the cables to the next floor (and its sensing device).

It will be observed that during lifting, each sensing device 66 will move a distance which corresponds to the movement of its respective point, while the weight 69, cable 68 and operating arm 67 will move a distance which corresponds to the movement of the common region 70. If these two distances remain equal then the sensing device 66 and the common region 70 are moving at the same rate of speed. However if these two distances vary, then the sensing device is moving at a different rate of speed than the common region, and the sensing device will indicate this fact by means of apparatus to be presently described.

As seen in FIGURE 5, each sensing device 66 comprises a housing 72 which is secured to the base portion 52 of the support structure 36 by three bolts 74 and cushioning springs 76. By means of these bolts it is possible to position sensing device 66 after fastening cable 68 to clamp 75. The upper surface of the housing 72 carries a plurality of depending contacts 78, 80, 82, 84, 86, 88 secured to place by screw-threaded rods 89 and springs 90. A lower surface of the housing carries a similar plurality of upwardly extending contacts 92, 94, 96, 98, 100 and 102. Minute adjustment of the contacts may be made by means of nuts 89(a). Operating arm 67 passes within an aperture 103 of the housing 72 and terminates in a triangle-shaped portion 104, which is normally spaced at a predetermined distance from the upper and lower contacts. Operating arm 67 is freely rotatable within aperture 103 in a plane which corresponds to the plane of the paper upon which FIGURE 5 is drawn.

For the sake of illustration, let it be assumed that point 37 of FIGURE 1 is rising at a greater rate of speed than preselected common point 70. It will necessarily follow that sensing device 66 will rise at a greater rate of speed than weight 69, cable 68 and the clamping end 75 of operating arm 67. Thus operating arm 67 will rotate in a clockwise direction, as indicated by the arrow 108, and end portion 104 thereof will sequentially engage contacts 78–88 to provide an indication that the point 37 and its associated sensing device 66 is rising faster than the common point 70.

On the other hand, if point 37 is rising at a slower rate of speed the common point 70, sensing device 66 would be rising slower than weight 69, cable 68, and the clamping end 75 of operating arm 67. Thus operating arm 67 would rotate in a counterclockwise direction, indicated by arrow 106, and cause end portion 104 thereof to sequentially engage lower contacts 92–102, thus providing an indication of such deviation of the point 37 with respect to the common point 70.

It will be obvious that the same result would be achieved if the operating arm 67 was a uniform rod and the contacts 78–88 and 92–102 were varyingly spaced from their upper and lower surfaces of the housing 72 respectively.

An alternative embodiment of sensing device 66 is shown in FIG. 9 wherein operating arm 67a is pivoted about point 103a and moves directly with cable 68 within a slot 105 provided in the housing 72a. Upper contacts 78a–88a and lower contacts 92a–102a are normally spaced at a predetermined distance from the upper and lower surfaces of the housing 72a.

Operation of the sensing device of FIG. 9 is similar to the operation of the device of FIG. 5. If point 37 is rising at a greater rate of speed than preselected common point 70, operating arm 67a will rotate in a counterclockwise direction, as indicated by arrow 108a, and sequentially engage contacts 92a–102a. If point 37 is rising at a slower rate of speed than common point 70, operating arm 67a will rotate in the clockwise direction, as shown by arrow 106a, and sequentially engage contacts 78a–88a.

FIGURE 6 shows a portion of a panelboard 110 which might be used in conjunction with the sensing devices 66 illustrated in FIGURE 5 or FIGURE 9. Panelboard 110 is provided with a plurality of groups of lights 112 each group of which is electrically connected to upper contacts 78–88 of each sensing device 66. The lower portion of the panelboard is provided with a plurality of groups of lights 114 each group of which is electrically connected to the lower contacts 92–102 of each of the sensing devices 66. The center line 116 corresponds to the elevation of the central point 70.

The groups 112 and 114 located on the extreme left of the panelboard 110 correspond to the sensing of the point 37, and as the lights are successively lit within these groups, they provide a visual indication of the elevation of point 37 with respect to the common point 70. If the last light 88 or 102 flashes on, it is an indication that the point 37 has reached its maximum allowable deviation (either above or below) from the common point 70, and the lifting cable 24 may be either manually or automatically reeled in or let out to adjust the elevation of the point 37 in response to that signal.

The remainder of the groups of lights 112 and 114 provide an indication of the deviation of their respective sensing devices (and the point on the floor to which they are attached), and thus the panelboard provides the operator with a visual indication of the relative elevations of all of the points being sensed with respect to the common point and with respect to one another. The darkened circles of FIGURE 6 represent an illustrative reading of the panelboard 110 and shows that all of the eight points being sensed are well within their maximum allowable deviation. Of course, adjustments to raise or lower points 37, 39, 41, 43 to bring them into closer relation to common point 70 need not wait until the maximum reading of 102 or 88 is reached.

FIGURE 7 is a schematic illustration of a second embodiment of the instant invention, with like numbers being used to indicate like parts. Uprights 16 and 18 are provided with suitable lifting apparatus 34 (which may be similar to the apparatus of FIGURE 1) and lifting cables 118, 120, each of which is secured to the points 122, 124 of the floor 12 being lifted. The lifting apparatus 34 carried by uprights 16 and 18 has screw-threaded rods 128 and 130 depending therefrom, and sensing devices 134 and 136 are located on the floor 12 at each of the lifting points 122 and 124.

Each of the sensing devices 134 and 136 is provided with a small motor 140, the output shaft 142 of which carries a ratchet gear 144 (see FIGURE 8). Each sensing device further includes upper and lower limit switches 146 and 148 respectively.

Threadably engaged on each of the depending rods 128 and 130 are actuating disks 150 which are provided on their exterior peripheries with saw teeth 152 which engage the ratchet gear 144 of motor 140. Arm 153 maintains ratchet gear 144 and disk 150 in approximately the same horizontal plane (FIGURE 8). Each disk 150 normally resides at a predetermined distance from the upper and lower limit switches 146, 148 of each of the sensing devices 134 and 136. The apparatus of FIGURE 7 functions to indicate a deviation in elevation of any of the points being lifted (122, 124) with respect to a common point, in this case arbitrarily chosen as point 122, in a manner to be presently described.

When all points on the floor 12 are being lifted at the same rate of speed, disk 150 on rod 130 trips the lower limit switch 148 of the sensing device 136. A signal is then sent to motors 140 of all of the sensing devices with gears 142 rotating in response thereto to cause disks 150 to climb the rods 128, 130. As long as no point on the floor deviates from the rate of speed of the common point 122, the disks 150 will continue to climb in response to disk 150 tripping lower limit switch 148 of sensing device 136.

However, if one of the points, for example 124, should be rising at a greater rate of speed than common point 122, disk 150 of sensing device 134 will trip lower limit switch 148 of that sensing device and cause an appropriate signal to be sent to the lifting means of cable 120 to decrease the rate of movement of point 124 in response thereto until proper compensation is made. Similarly, if point 124 is rising at a rate of speed which is less than common point 122, disk 150 of sensing device 134 will trip the upper limit switch 146 of that sensing device and an appropriate signal will be sent to the lifting device of cable 120 to increase the lifting speed of point 124 until proper compensation is made.

It is noted that a sensing device similar to the one described in FIGURES 5 and 9 may be used to obtain a more accurate indication of the deviation of the points on the floor. Such a sensing device would preferably include a plurality of limit switches spaced at varying distances from the surfaces of disks 150 and could be used in conjunction with a panelboard of the type shown in FIGURE 6.

There has thus been provided simple apparatus for sensing deviation in elevation of a plurality of points about a body being lifted which operates by continually comparing the distance moved by each of the points with the distance moved by a common region on the body itself. Such sensing apparatus is seen to function independently of the apparatus used to lift the body; and furthermore functions independently of the weight of the body itself.

Although the instant invention has been described with a certain degree of particularity, it is understood that the present disclosure is made only by way of example and that numerous changes in the details of construction and the combination and arrangement of parts may be resorted to without departing from the spirit and the scope of the invention as hereinafter claimed.

The embodiments of the invention in which an exclusive privilege or property is claimed are defined as follows:

1. Apparatus for sensing variation in relative position of a plurality of points about a body being lifted, said apparatus comprising:
    sensing means located at each of said plurality of points, each sensing means moving a first distance corresponding to the movement of its respective point;
    actuating means operatively associated with each sensing means, each actuating means moving a second distance corresponding to the movement of a preselected region of the body being lifted;
    each of said sensing means including means for indicating a deviation between its respective first distance and said second distance.

2. The apparatus of claim 1 wherein said means for indicating a deviation comprises:
    at least one contact element normally positioned a predetermined distance from said actuating means;
    deviation of said first and second distances by more than said predetermined distance causing said actuating means to engage said contact.

3. The apparatus of claim 1 wherein said means for indicating a deviation comprises:
    a plurality of spaced contact elements normally positioned at predetermined distances from said actuating means;
    increasing deviation of said first and second distances beyond said predetermined distances causing said actuating means to sequentially engage individual ones of said plurality of contacts.

4. The apparatus of claim 3 wherein said means for indicating a deviation further includes a housing having means for supporting said spaced contact elements, said actuating means having a portion thereof extending within said housing and normally positioned at predetermined distances from said contacts.

5. Apparatus for sensing variation in relative position of a plurality of points about a body being lifted, said apparatus comprising:
    sensing means located at each of said plurality of points, each sensing means moving a first distance corresponding to the movement of its respective point;

and actuating means operatively connecting each of said sensing means with a common region on said body, each of said actuating means moving a second distance corresponding to the movement of said common region;

each of said sensing means including means for indicating a deviation between its respective first distance and said second distance.

6. The apparatus of claim 5 wherein said means for indicating a deviation comprises:

at least one contact element normally positioned a predetermined distance from said actuating means;

deviation of said first and second distances by more than said predetermined distance causing said actuating means to engage said contact.

7. The apparatus of claim 5 wherein said means for indicating a deviation comprises:

a plurality of spaced contact elements normally positioned at predetermined distances from said actuating means;

increasing deviation of said first and second distances beyond said predetermined distances causing said actuating means to sequentially engage individual ones of said plurality of contacts.

8. The apparatus of claim 7 wherein said means for indicating a deviation further includes a housing having means for supporting said spaced contact elements, said actuating means having a portion thereof extending within said housing and normally positioned at predetermined distances from said contacts.

9. Apparatus for lifting a plurality of points of a body at the same rate of speed comprising:

a plurality of uprights positioned at selected points of a body which is to be lifted;

means for lifting said body at said selected points;

sensing means located at each of said plurality of points, each sensing means moving a first distance corresponding to the movement of its respective point;

actuating means operatively associated with each sensing means and supported by one of said uprights, each actuating means moving a second distance corresponding to the movement of a preselected region of the body being lifted;

each of said sensing means including means for indicating a deviation between its respective first distance and said second distance.

10. Apparatus for lifting a plurality of points of a body at the same rate of speed comprising:

a plurality of uprights positioned at selected points around a body which is to be lifted;

means for lifting said body at said selected points;

sensing means located at each of said plurality of points, each sensing means moving a first distance corresponding to the movement of its respective point;

actuating means operatively connecting each of said sensing means with a common region on said body, each of said actuating means being supported by one of said uprights and moving a second distance corresponding to the movement of said common region;

each of said sensing means including means for indicating a deviation between its respective first distance and said second distance.

11. In combination with apparatus for sensing deviation in elevation of a plurality of points about a body being lifted, the subcombination of a sensing switch and a cooperating sensing element at each of said plurality of points, said sensing switch operatively connected to its respective point to move in elevation an amount corresponding to the movement of its respective point, said sensing element operatively connected to a reference region of the body other than said respective point to move in elevation an amount corresponding to the movement of said reference region; said sensing switch comprising:

a housing:

a plurality of electrical contacts supported by said housing;

said sensing element having a portion thereof extending within said housing and normally positioned at a predetermined distance from said contacts;

means for individually adjusting the distance between said contacts and sensing element;

movement of said sensing element beyond said predetermined distance causing said portion to progressively engage individual ones of said contacts.

12. In combination with apparatus for sensing deviation in elevation of a plurality of points about a body being lifted, the subcombination of a sensing switch and a cooperating sensing element at each of said plurality of points, said sensing switch operatively connected to its respective point to move in elevation an amount corresponding to the movement of its respective point, said sensing element operatively connected to a reference region of the body other than said respective point to move in elevation an amount corresponding to the movement of said reference region; said sensing switch comprising:

a housing;

a first plurality of electrical contacts supported by said housing;

a second plurality of electrical contacts supported by said housing;

said sensing element having a portion thereof extending within said housing and normally positioned at a predetermined distance from each of the contacts of each of said pluralities;

means for individually adjusting the distance between said contacts and sensing element;

movement of said sensing element in a first direction causing said portion to engage individual contacts of said first plurality;

movement of said sensing element in a second direction causing said portion to progressively engage individual contacts of said second plurality.

13. The apparatus of claim 2 wherein each of said activating means comprises a disk member movable between engaging and disengaging positions with respect to said contact.

References Cited
UNITED STATES PATENTS

| | | | |
|---|---|---|---|
| 2,391,881 | 1/1946 | Clay | 200—6 |
| 2,617,168 | 11/1952 | Johnson | 264—33 |
| 2,715,013 | 8/1955 | Slick | 254—106 |
| 2,761,285 | 9/1956 | Beecroft | 91—171 |
| 2,975,560 | 3/1961 | Leonard | 52—126 |
| 3,164,275 | 1/1965 | Schatzl et al. | 214—515 |

OTHELL M. SIMPSON, *Primary Examiner.*